C. D. BROWN.
END GATE.
APPLICATION FILED JUNE 12, 1915.

1,162,561.

Patented Nov. 30, 1915.

Inventor,
Charles D. Brown.

Witnesses:

By Victor J. Evans,
Attorney.

UNITED STATES PATENT OFFICE.

CHARLES D. BROWN, OF LISBON, IOWA.

END-GATE.

1,162,561.                    Specification of Letters Patent.       Patented Nov. 30, 1915.

Application filed June 12, 1915. Serial No. 33,787.

*To all whom it may concern:*

Be it known that I, CHARLES D. BROWN, a citizen of the United States, residing at Lisbon, in the county of Linn and State of Iowa, have invented new and useful Improvements in End-Gates, of which the following is a specification.

This invention is an improved end gate especially adapted for use on a wagon employed for hauling hogs and other live animals, the object of the invention being to provide an improved end gate which greatly facilitates the loading and unloading of the animals, another object being to provide the end gate with improved means for locking the gate both when it is in lowered closed position and when it is in raised open position.

The invention consists in the construction, combination and arrangement of devices hereinafter described and claimed.

Figure 1:
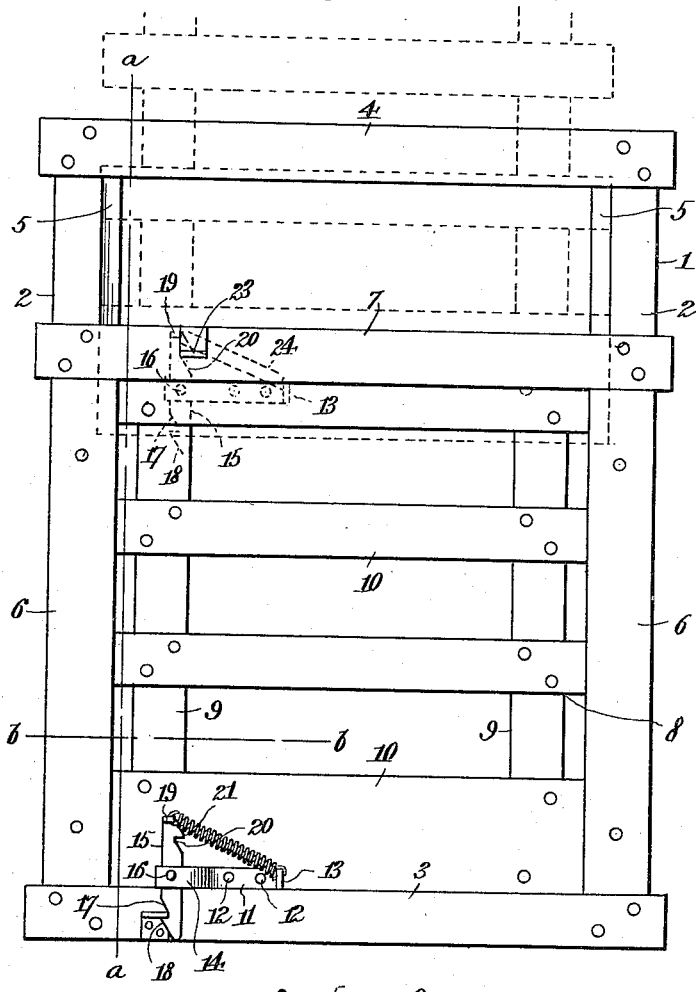
Figure 2:
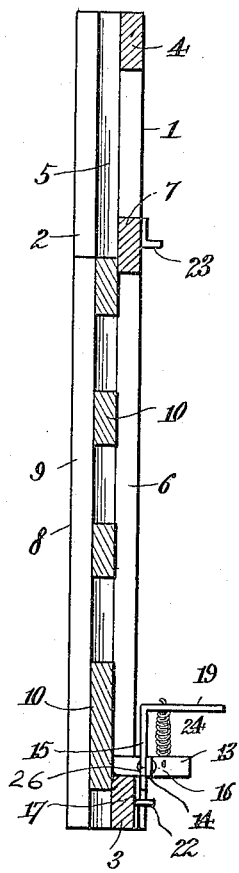
Figure 3:
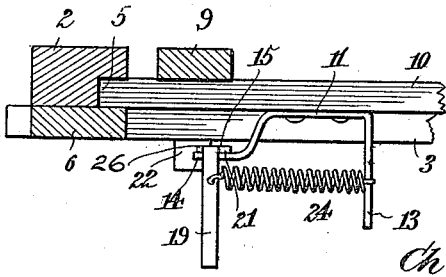

In the accompanying drawings; Figure 1 is an elevation of an end gate constructed in accordance with my invention, showing the gate in lowered closed position in full lines, and in raised, open position in dotted lines. Fig. 2 is a vertical sectional view of the same on the plane indicated by the line a—a of Fig. 1. Fig. 3 is a detail horizontal sectional view on the plane indicated by the line b—b of Fig. 1 and showing the latch and associated parts in plan.

The frame 1 of the end gate comprises vertical side members 2, a bar 3 which connects said side members at their lower ends and a bar 4 which connects the upper ends of said side members. The side members are provided in their opposing sides with guide grooves 5 and have guide strips 6 on their outer sides, extending upwardly a suitable distance from the bar 3 and the opposing edges of which overhang the guide grooves 5. An intermediate cross bar 7 connects the side members 2 and is arranged at a suitable distance from the lower cross bar 3.

The gate 8 comprises vertical strips 9 and cross strips 10 which are secured on the outer sides of the vertical strips and the ends of which project beyond the outer sides of the vertical strips and engage and are adapted to move vertically in the grooves 5 in the vertical sides of the frame, so that the gate is arranged for vertical movement in the frame and hence can be raised to open position, and can be lowered to closed position. On the lower strip 10 of the gate at a point a suitable distance from one side thereof is secured a metallic strap 11 by means of bolts 12. This strap is provided at its inner end with an outwardly extending arm 13 and is provided at its outer end with an offset arm 14. These arms of the strap form stops which engage the cross bar 3 when the gate is lowered and the cross bar 7 when the gate is raised and hence limit the extent of vertical movement of the gate. A double latch element 15 is pivotally mounted on the inner side of the offset arm 14, near the outer end of said offset arm, as at 16. This latch element is provided with a notch 17 on its outer side near its lower end and has its lower end beveled on its outer side to form a cam face 18. The latch element has its upper end provided with an outwardly extending arm 19 and also has a notch 20 on its inner side near its outer end, its upper end being beveled on the near side 21 to form said notch. The bar 3 of the frame has a keeper 22 for engagement by the notch 17 of the latch element. The bar 7 has a similar keeper 23 for engagement by the notch 20 of the latch element when the gate is raised. A spring 24 connects the arm 13 of the strap 11 with the arm 19 of the latch element and serves to hold the latch normally in engaged position. Said strap also has a stop 26 to limit the extent of movement of the latch element in one direction.

When the gate is lowered and closed the latch element by the engagement of its notch 17 by the keeper 22 locks the gate in such position as will be understood. In order to open the gate it is first necessary to partly turn the latch element against the tension of the spring and to cause the notch 17 to be disengaged by the keeper 22. The gate may be then readily raised. When it reaches nearly the upper limit of its movement the cam face 21 of the latch element rides on the keeper 23 and the spring 24 as said cam face moves above said keeper causes the latch element to engage said keeper 23 with its notch 20, thus automatically locking the gate in open position, as will be understood.

Having thus described my invention I claim:—

1. In combination a frame having lower and upper keepers, a vertically movable gate in the frame, a pivotally mounted latch element carried by the gate and having notches and cam faces on its opposing sides at opposite ends to respectively engage said keepers, to lock the gate in lowered or raised position, and a spring to normally hold the latch element in engaged position.

2. A frame having vertical guide ways in opposite sides and also having lower and upper cross bars, each of said cross bars having a keeper, in combination with a gate engaged at its sides in guide ways of the frame and arranged for vertical movement in the frame, a plate on the lower portion of the gate having an outstanding arm and an outstanding offset arm forming stops to limit the vertical movement of the gate by engagement with said bars of the frame, a latch element pivotally mounted on the offset arm of the strap and provided at opposite sides and ends with notches and cam faces for engagement respectively with said keepers, to lock the gate in closed or opened position, and a spring to hold the latch element in normal engaged position and connecting said latch element with the outstanding arm of the strap.

In testimony whereof I affix my signature in presence of two witnesses.

CHARLES D. BROWN.

Witnesses:
W. M. ZIMMERMAN,
JOHN AURACHER.

Copies of this patent may be obtained for five cents each, by addressing the "Commissioner of Patents, Washington, D. C."